Feb. 29, 1944. D. S. HERSEY ET AL Re. 22,447
FUEL METERING DEVICE
Original Filed April 24, 1940
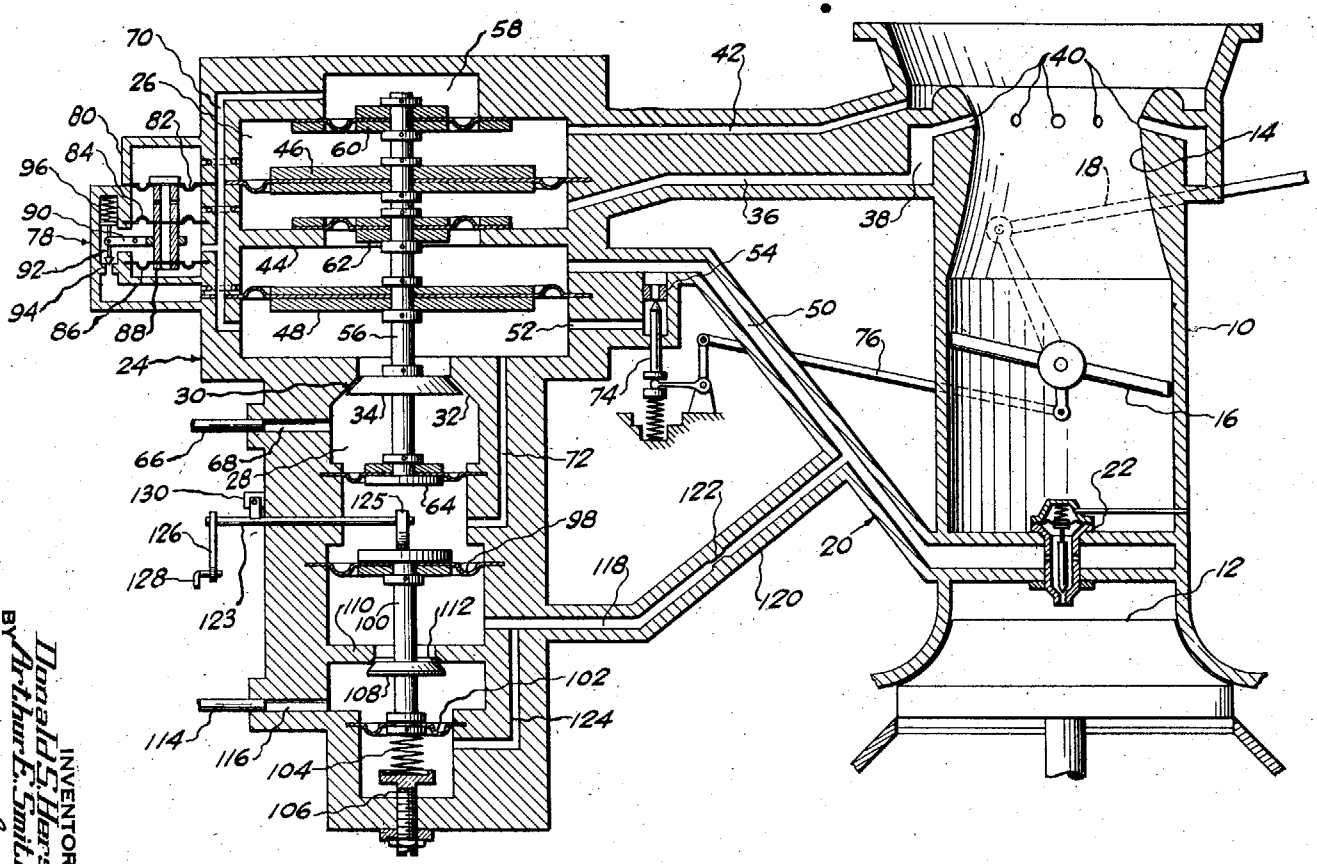
INVENTOR
Donald S. Hersey
BY Arthur E. Smith
Harris G. Luther
ATTORNEY Reissued Feb. 29, 1944

Re. 22,447

UNITED STATES PATENT OFFICE 22,447

FUEL METERING DEVICE

Donald S. Hersey, East Hartford, Conn., and Arthur E. Smith, Kansas City, Kans., assignors to United Aircraft Corporation, East Hartford, Conn., a corporation of Delaware Original No. 2,295,656, dated September 15, 1942, Serial No. 331,448, April 24, 1940. Application for reissue September 9, 1943, Serial No. 501,720

4 Claims. (Cl. 261—18)

This invention relates to improvements in engine fuel metering controls and has particular reference to an improved fuel metering device for an internal combustion engine utilizing explosive charges formed by evaporating fuel in the intake air.

An object of the invention resides in the provision of an improved fuel metering device of the character indicated which is operative to meter a standard fuel to the engine at all times during engine operation and to meter an auxiliary fuel to the engine under certain predetermined engine operating conditions.

A somewhat more specific object resides in the provision of an improved fuel metering device of the character indicated which is operative to supply a regulated quantity of detonation reducing fuel modifying substance to the engine under engine operating conditions where detonation is likely to occur.

A still further object resides in the provision in an improved fuel metering device of the character indicated of manually controllable means for causing an injection of the auxiliary fuel into the engine fuel supply as the operator may desire, for instance at such time as there appears to be a condition of ice formation in the engine intake.

Other objects and advantages will be more particularly pointed out hereinafter or will become apparent as the description proceeds.

In the accompanying drawing, in which like reference numerals are used to designate similar parts throughout, there is illustrated a suitable mechanical embodiment of a portion of an engine intake and a fuel metering device, for the purpose of disclosing the invention. The drawing, however, is for the purpose of illustration only and is not to be taken as limiting the invention since it will be apparent to those skilled in the art that various changes in the illustrated construction may be resorted to without in any way exceeding the scope of the invention.

In the accompanying drawing, the single figure is a longitudinal sectional view of a portion of an engine intake with a fuel metering device, constructed according to the invention, applied thereto, the drawing being largely diagrammatic in character.

As is well known to those skilled in the operation of internal combustion engines, detonation of the fuel charges in the engine cylinders tends to occur only under particular engine operating conditions and if the fuel used is well suited to the engine, detonation, if it occurs at all, will usually occur only in the upper portion of the engine power range. Even with the best fuel, however, in order to obtain good fuel economy it is necessary to operate the engine near the detonation point in the upper portion of the power range and it frequently happens that detonation occurs when the engine reaches the upper part of the range. For example, in the case of an airplane engine, in order to obtain good fuel economy in the cruising range it is necessary to run the engine very close to the detonation point in the take-off portion of the power range. It has been found that the economy can be considerably improved if the engine is run quite close to the detonation point in the cruising portion of the power range, so that it would normally detonate in the full throttle and take-off portion of the power range, and then to supply an ingredient to the fuel during only those portions of the power range in which detonation would occur to suppress the detonation under those particular operating conditions. If an engine is so adjusted that it will run on ordinary aviation gasoline without detonation except in the take-off portion of the power range, a small quantity of fuel ingredient of high anti-detonation characteristics supplied to the engine only during the take-off period will provide detonation free engine operation and excellent fuel economy as the take-off operation of the engine is a very small fractional part of its total operation. It has been found that an ingredient comprising a mixture of aniline and alcohol is very effective in eliminating detonation in those portions of the power range in which detonation would occur with the ordinary engine fuel and that, by adjusting the engine so that detonation would occur in the take-off portion of the range, for example, on the ordinary fuel and then supplying additional anti-detonating fuel, such as the aniline and alcohol mixture, to the engine during take-off, greatly improved fuel economy and detonation free operation is obtained. Instead of the additional fuel, a fuel modifying substance, such as tetra-ethyl lead, or a combination of the two may be used, if desired. It is essential, however, that the additional material should be automatically supplied to the engine whenever the power output of the engine exceeds the value at which the engine will operate without detonation on the ordinary fuel, as the operator of the engine may not always be able to detect the detonation point and supply the additional material in time to avoid the beginning of detonation. It has been found that once detonation starts a dangerous loss of engine power can occur before it can be stopped and the engine operation restored to detonation free operation. It has also been found that the auxiliary fuel supplied to suppress detonation can be given excellent de-icing characteristics, particularly if an auxiliary fuel such as the alcohol and aniline mixture is used, and the present invention contemplates the provision of means whereby this fuel can be injected into the engine intake system when its de-icing characteristics are needed, as well as for its detonation suppressing purpose.

Referring to the drawing in detail, the numeral 10 generally indicates the engine intake conduit. In the arrangement illustrated, an engine supercharger impeller 12 is positioned at one end of this conduit and an air flow measuring Venturi throat 14 is positioned at the opposite end. A throttle 16 is disposed in the conduit between the Venturi throat and the impeller and may be operated by a manual control mechanism, as generally indicated at 18. A fuel conduit 20 leads through the wall of the intake conduit 10 and is provided interiorly of the intake conduit with a nozzle 22 which directs a spray of fuel into the impeller 12. A suitable fuel injecting mechanism may be such as illustrated in United States application Serial No. 302,891 for Fuel supply systems, filed November 4, 1939, by Richard S. Buck.

A casing, generally indicated at 24, is disposed adjacent to the intake 10 or secured thereto, and provided interiorly thereof with two chambers 26 and 28 separated by a valve, generally indicated at 30, and comprising the valve seat 32 and valve gate 34. The chamber 26 is connected by a channel 36 with an annular chamber 38 surrounding the venturi and connected with the interior of the Venturi throat by a plurality of ports 40 and is connected with the interior of the intake 10 on the upstream side of the venturi relative to the direction of air flow, by a channel 42. The chamber 26 is divided into substantially equal portions by a transverse partition 44 and each of these portions is substantially equally divided by a transverse diaphragm as indicated at 46 and 48, respectively. From an inspection of the drawing it will be observed that the channels 36 and 42 both lead to the space on one side of the transverse partition 44 and respectively to opposite sides of the diaphragm 46. A channel 50 through the fuel conduit 20 leads from the space at one side of the diaphragm 48 to the nozzle 22 and a second channel 52 leads from the space at the opposite side of the diaphragm 48 through a restricted orifice 54 to the channel 50. The diaphragms 46 and 48 are both mounted in spaced relation on a shaft 56 which extends through an aperture in the partition 44 and through the opening of the valve 30 to a position below the valve gate 34 and also extends at its upper end into a recess 58 provided in the end wall of the chamber 26. A diaphragm 60, connected to the end of the shaft 56, seals the inner end of the recess 58, a second diaphragm 62, connected to the shaft, seals the aperture through the partition 44, and a third diaphragm 64, connected to the lower end of the shaft, divides the lower chamber 28. The main fuel supply line 66 connects with a channel 68 leading into the space in the lower chamber 28 between the diaphragm 64 and the valve gate 34. A channel 70 connects the space below the diaphragm 48 with the interior of the recess 58. This portion of the apparatus will meter the fuel to the engine, in accordance with the measured air flow, through the intermediate portion of the engine power operating range, in substantially the following manner.

Air flowing through the Venturi throat 14 will produce a pressure differential in the channels 36 and 42 which differential is transferred to the opposite side of the diaphragm 46 tending to force the diaphragm in a direction to open the valve 30. When the valve 30 is open fuel will flow from the line 66 through the valve into the space in the upper chamber 26 below the diaphragm 48 from where it will flow through the channel 52, and channel 50 to the fuel nozzle 22. As the channel 50 is also connected with the space above the diaphragm 48, as long as there is fuel flow through the channel 50 a pressure differential will be set up upon the opposite sides of the diaphragm 48 by reason of the restriction 54, which pressure differential will have a tendency to move the diaphragm 48 in a direction to close the valve 30. Thus the resultant of the pressure differential acting on the diaphragm 46 is in the opposite direction to the resultant of the pressure differential acting on the diaphragm 48. In operation the pressure differential acting on the diaphragm 46 moves the valve 30 and thereby adjusts the pressure differential acting on the diaphragm 48 until the resultants of these differential pressures are equal. At this time the stem 56 is at rest and the mechanism is effective to accurately balance the amount of fuel flowing through the orifice 54 to the amount of air flowing through the venturi 14. In order that the only valve moving forces acting on the valve 30 shall be the resultants of the pressures acting on the diaphragms 46 and 48, the forces resulting from the pressures acting on the remaining elements on the stem 56 are balanced out as follows:

The channel 70 connects the space below the diaphragm 48 with the interior of the recess 58 and an additional channel 72 connects the space below the diaphragm 48 with the space below the diaphragm 64 to transmit the pressure below the diaphragm 48 to those two points. The pressure on diaphragm 64 balances the pressure on the valve 30 except for the pressure on the area of the stem 56 which is balanced by the same pressure on that area in the space 58. The resultant of the difference in pressures acting on the lower side of diaphragm 60 and the upper side of diaphragm 62 is balanced by the resultant of the same difference in pressures acting on the lower side of diaphragm 62 and the upper side of diaphragm 60.

As the fuel metering device does not operate accurately at extremely low airflow rates through the venturi and extremely small throttle openings, an auxiliary metering valve 74 cooperating with the orifice 54 and operated by a connection 76 with the throttle 16, is provided to meter the fuel during engine idling operation.

A fuel economizer, generally indicated at 78, may also be incorporated to richen the fuel mixture above a predetermined point in the engine operating power range. This economizer may include a chamber 80 divided by transverse diaphragms 82, 84 and 86 connected together by a shaft 88 to which is connected a lever arm 90 pivotally connected at one end to a valve member 92 urged into closing relation with a valve seat 94 by a compression spring 96. The spaces provided by the diaphragms 82, 84 and 86 are connected with the spaces at the opposite sides of the main diaphragm 46 in such a manner that when the pressure differential exerted on this main diaphragm exceeds a predetermined value in a direction to open the valve 30 the corresponding pressure differential on the economizer diaphragms will become sufficient to compress the spring 96 and open the valve 92 to admit additional fuel through this valve from the space below the diaphragm 48 to the space in the chamber 26 above the diaphragm 48 and below the partition 44 and from thence through the channel 50 to the fuel nozzle 22.

For a more detailed description of the construction and operation of a suitable fuel metering device, idling range control and economizer reference may be had to United States application Serial No. 302,749 for Fuel control devices, filed November 3, 1939, by Guy E. Beardsley, Jr.

The lower portion of the chamber 28 is sealed off by a transverse diaphragm 98 and from this diaphragm a shaft 100 extends downwardly in the chamber to a second diaphragm 102 below which the end of the shaft 100 rests upon a compression spring 104 the lower end of which is carried upon an adjustable abutment 106. Between the diaphragms 98 and 102 the stem carries a valve gate 108 which cooperates with a seat formed around an aperture in a transverse partition 110 to constitute a valve generally indicated at 112. A secondary fuel line 114 connects with a channel 116 leading into the space between the partition 110 and the diaphragm 102 and a channel 118 leads through a conduit 120 including a restricted orifice 122 from the space between the partition 110 and the diaphragm 98 to the channel 50.

The pressure on the fuel in the space in the chamber 26 below the diaphragm 48 will be transmitted through the passage 72 to the space in the lower chamber 28 between the diaphragms 64 and 98.

The pressure on the fuel in the line 50, as long as there is no fuel flowing in the line 118, is transmitted through the passages 118 and 120. The pressures acting on the diaphragm 102 balance the pressures acting on the valve 108 in a manner similar to the way the pressures on the valve 30 are balanced by the pressures on the diaphragm 64 of the main fuel supply except that in this case, the pressure on the area of the stem 100 does not have a force opposing it, but in effect adds to the pressure acting on the lower side of the diaphragm 98. It will thus be seen that the flow responsive force tending to move the valve 108 is the product of the area of diaphragm 98 and the difference in pressures acting on the diaphragm 98 which difference, as has been pointed out above, is the same as the difference in pressures acting upon the diaphragm 48 and which in turn is the same as the difference in the pressures acting upon the diaphragm 46. The force on the diaphragm 98 tends to open the valve 108 and is opposed by the spring 104 supported by the adjustable abutment 106. The abutment 106 is adjusted to maintain the valve 108 closed until the difference in the pressures acting on the diaphragm 98 exceeds a predetermined value. As this differential pressure is the same as the differential pressure of the airflow measuring mechanism, it is at once apparent that the valve 112 is maintained closed until the airflow to the engine exceeds a predetermined amount which would be the point in the engine power operating range at which it is desired to begin the injection of auxiliary fuel or a fuel modifying substance.

When this point is reached and the force of the spring 104 is overcome and the valve 112 begins to open, auxiliary fuel will flow from the line 114 through the valve 108, and channel 118, to the channel 50 where it will mix with the regular fuel being fed to the nozzle 22.

Regardless of the differential pressure acting on the diaphragm 46, the differential pressure acting on the diaphragm 98 will not increase materially above the pressure required to open the valve 112. The increase in differential pressure will depend only on the spring rate of the spring 104 and the extent to which the valve 112 must be opened to maintain that differential pressure. The difference between the pressures acting upon the diaphragm 46 and the pressures acting upon the diaphragm 98 in these higher values will be accounted for by the pressure drop across the orifice 122. This drop will, of course, be substantially proportionate to the increase in differential pressure above the predetermined amount so that the fuel flow will be accordingly proportioned to this increase in differential pressure and hence to the increase in airflow.

If desired, the spring 104 may be so adjusted and the value of spring 96 of the economizer 78 so chosen that the valve 112 will open to supply auxiliary fuel to the engine when the economizer valve 92 opens to richen the engine fuel for extremely high power operating conditions. It is not necessary, however, that there be any definite cooperation between the economizer and the auxiliary fluid supply.

The auxiliary fuel and the anti-detonating substance may, if desired, be so chosen that the economizer may be dispensed with and the auxiliary valve 108 relied upon to perform the entire functions of supplying additional fuel for economizer action and for supplying an anti-detonating substance.

Whenever auxiliary fuel is supplied to the engine it is mixed with the main fuel supply before reaching the carburetor discharge jet or the injection nozzle in order that the detonation reducing fluid may be distributed evenly with the main fuel to all of the engine cylinders. With this arrangement, if there is a good distribution of the main fuel, there will be an equally good distribution of the mixture of the main fuel and the auxiliary fluid and the detonation inhibiting tendency will be applied equally to all of the engine cylinders.

Any suitable manually actuatable means may be provided to open the valve 108 against the valve closing force of the spring 104 when it is desired to inject the auxiliary fuel for de-icing the intake passages or for other purposes, when the engine is not operating at sufficient power to cause an automatic injection of said auxiliary fuel in sufficient quantity.

In the arrangement illustrated, a shaft 123 projects through the casing 24 and causes at its inner end a cam 125 which is positioned over the upper end of the stem 100. A lever arm 126 is connected to the end of the shaft 123 outside of the casing 24 and a manually operable linkage, as indicated at 128, is connected to the free end of the lever to rotate the shaft 123 under manual actuation and cause the cam 125 to bear against the upper end of the stem 100 and open the valve.

While a suitable mechanical arrangement has been illustrated in the accompanying drawing and hereinabove described for the purpose of disclosing the invention, it is to be understood that the invention is not limited to the particular arrangement so illustrated and described, but that such changes in the illustrated arrangement may be resorted to as come within the scope of the subjoined claims.

Having now described the invention so that others skilled in the art may clearly understand the same, what it is desired to secure by Letters Patent is as follows:

1. An engine fuel supply system comprising, an air intake, a venturi in said intake for measuring the quantity of air flowing therethrough, a fuel supply line, means responsive to the airflow through said venturi and the fuel flow through said supply line for proportioning the quantity of fuel to the quantity of air, a nozzle for injecting said fuel into the air stream, an economizer device for increasing the proportion of fuel in the fuel-air mixture whenever the quantity of air flow exceeds a predetermined value, means for introducing an anti-detonation ingredient other than said fuel into the fuel supply ahead of said discharge means, means for withholding and controlling the flow of said ingredient including a valve, and fuel pressure responsive means for actuating said valve in accordance with the quantity of air flowing through said venturi.

2. An engine fuel supply system comprising, an air intake, a venturi in said intake for measuring the quantity of air flowing therethrough, a fuel supply line, a restricted orifice in said line, means responsive to the airflow through said venturi and the fuel flow through said orifice establishing a fuel pressure differential across said orifice which is a function of said airflow for proportioning the quantity of fuel to the quantity of air, means for discharging said fuel into the airstream, an economizer device for increasing the proportion of fuel in the fuel-air mixture over the higher power portion of the engine power range, means for introducing into said airstream an anti-detonation ingredient having a composition different from said fuel, and means for metering the quantity of said ingredient so introduced comprising a valve and means for actuating said valve in accordance with variations in said pressure differential to substantially proportion the quantity of ingredient to the quantity of air.

3. In an engine fuel supply system, an air intake, a venturi in said intake for measuring the quantity of air flowing to the engine, a fuel conduit for discharging fuel under pressure into said air, a fuel flow restriction in said fuel conduit for metering the flow of said fuel, means responsive to variations in both the airflow through said venturi and the fuel flow through said fuel restriction for maintaining a fuel pressure differential across said fuel restriction which is a function of the quantity of said airflow, a fluid intake for introducing an ingredient having a composition different from said fuel into said air, an ingredient flow restriction in said ingredient intake for establishing an ingredient pressure differential for metering the flow of said ingredient, and valve means responsive to variations in said fuel pressure differential for varying said ingredient pressure differential in accordance with variations in said fuel pressure differential.

4. In a charge forming apparatus for an internal combustion aircraft engine having an air intake, the combination comprising, a fuel flow regulating device including a fuel supply line for introducing fuel under pressure into the engine charging air and a fuel metering orifice in said fuel line, a liquid supply line for introducing an ingredient having a composition different from said fuel into the engine charging air, an ingredient metering orifice in said ingredient line, said fuel line and said ingredient line being connected on the lower pressure sides of said orifices, and means for regulating the pressure of the ingredient on the higher pressure side of said ingredient orifice comprising an ingredient flow controlling device in said ingredient line and means subjected to the pressure of said fuel on the higher pressure side of said fuel orifice and the pressure of said ingredient on the higher pressure side of said ingredient orifice for operating said flow controlling device.

DONALD S. HERSEY.
ARTHUR E. SMITH.